(12) United States Patent
Liu et al.

(10) Patent No.: US 10,425,210 B2
(45) Date of Patent: Sep. 24, 2019

(54) METHOD FOR TRANSMITTING UPLINK CONTROL INFORMATION

(71) Applicant: Alcatel Lucent, Boulogne Billancourt (FR)

(72) Inventors: Jin Liu, Shanghai (CN); Xudong Zhu, Shanghai (CN)

(73) Assignee: Alcatel Lucent, Nozay (FR)

( * ) Notice: Subject to any disclaimer, the term of this patent is extended or adjusted under 35 U.S.C. 154(b) by 428 days.

(21) Appl. No.: 14/385,979

(22) PCT Filed: Mar. 18, 2013

(86) PCT No.: PCT/IB2013/000605
§ 371 (c)(1),
(2) Date: Sep. 17, 2014

(87) PCT Pub. No.: WO2013/140245
PCT Pub. Date: Sep. 26, 2013

(65) Prior Publication Data
US 2015/0049698 A1    Feb. 19, 2015

(30) Foreign Application Priority Data

Mar. 19, 2012  (CN) .......................... 2012 1 0074090

(51) Int. Cl.
*H04L 5/00* (2006.01)
*H04B 7/024* (2017.01)

(52) U.S. Cl.
CPC ........... *H04L 5/0057* (2013.01); *H04B 7/024* (2013.01); *H04L 5/0035* (2013.01)

(58) Field of Classification Search
None
See application file for complete search history.

(56) References Cited

U.S. PATENT DOCUMENTS

| | | | |
|---|---|---|---|
| 2009/0092103 A1* | 4/2009 | Rao ....................... | H04L 1/0026 370/336 |
| 2010/0027456 A1* | 2/2010 | Onggosanusi ......... | H04B 7/024 370/312 |

(Continued)

FOREIGN PATENT DOCUMENTS

| KR | 10-2011-0114481 | 4/2011 |
|---|---|---|
| RU | 2396714 C1 | 8/2010 |

(Continued)

OTHER PUBLICATIONS

Huawei, "Downlink CoMP system evaluation and feedback analysis for each category," 3GPP TSG RAN WG1 meeting #57, San Francisco, USA, May 4-8, 2009, R1-091799, Agenda Item: 15.2, Document for: Discussion and decision, 6 pages.

(Continued)

*Primary Examiner* — Mohammad S Adhami
(74) *Attorney, Agent, or Firm* — Fay Sharpe LLP

(57) ABSTRACT

A method for transmitting uplink channel state information (CSI) in a coordinated multi-point (CoMP) system is provided, which includes coding and multiplexing operations. In a multiple input multiple output (MIMO) system, a method for transmitting CSI of multiple coordinated points according to an embodiment of the present invention includes coding the CSI of the multiple coordinated points, modulating the coded CSI of the multiple coordinated points, and multiplexing the modulated CSI on a physical uplink shared channel (PUSCH). Multiplexing a rank indicator (RI) in the CSI includes multiplexing different RIs for different uplink ranks, and multiplexing a channel quality indicator/precoding matrix indicator (CQI/PMI) in the CSI includes multiplexing the CQI/PMI in a code word with the highest modulation and coding order and in other code words. Therefore, an issue with the application of the CoMP technology that one user equipment (UE) transmits CSI of (Continued)

multiple coordinated points may be solved, which may facilitate a further development of the CoMP technology.

23 Claims, 2 Drawing Sheets

(56) References Cited

U.S. PATENT DOCUMENTS

| | | | |
|---|---|---|---|
| 2012/0243440 A1 | 9/2012 | Zhang | |
| 2012/0257531 A1* | 10/2012 | Ko | H04B 7/0417 370/252 |
| 2013/0003788 A1* | 1/2013 | Marinier | H04B 7/024 375/219 |
| 2013/0077514 A1* | 3/2013 | Dinan | H04L 5/0057 370/252 |

FOREIGN PATENT DOCUMENTS

| | | | |
|---|---|---|---|
| WO | 2007/117127 A1 | 10/2007 | |
| WO | 2011/023216 A1 | 3/2011 | |
| WO | WO 2011/023216 A1 | 3/2011 | |
| WO | 2011/079696 A | 7/2011 | |
| WO | WO 2011/079696 A1 | 7/2011 | |
| WO | 2011/137408 A2 | 11/2011 | |
| WO | WO 2011/137408 A2 | 11/2011 | |
| WO | 2012/105793 A2 | 8/2012 | |

OTHER PUBLICATIONS

Samsung, "Discussion on Data and Control Multiplexing in UL MIMO Transmissions," 3GPP TSG RAN WG1 #60bis, Beijing, China, Apr. 12-16, 2010, R1-102212, Agenda item: 6.4.4, Document for: Discussion and Decision, 3 pages.

Nokia Siemens Networks et al., "Performance evaluation of UCI multiplexing schemes on PUSCH in case of SU-MIMO," $3^{rd}$ Generation Partnership Project (3GPP), 3GPP TSG RAN WG1 Meeting #61, R1-102962, 6 pages, XP050420330, Montreal, Canada, May 10-14, 2010.

Samsung, "Further Discussion on Data and Control Multiplexing in UL MIMO Transmissions," $3^{rd}$ Generation Partnership Project (3GPP), 3GPP TSG RAN WG1 #61bis, R1-103675, pp. 1-6, XP050449122, Dresden, Germany, Jun. 28-Jul. 2, 2010.

Alcatel-Lucent Shanghai Bell et al., "Further Discussions on UCI Multiplexing on PUSCH in case of SU-MIMO," $3^{rd}$ Generation Partnership Project (3GPP), 3GPP TSG RAN WG1 Meeting #61bis, R1-104163, pp. 1-5, XP050449590, Dresden, Germany, Jun. 28-Jul. 2, 2010.

International Search Report for PCT/IB2013/000605 dated Sep. 5, 2013.

Su-Mimo, "Performance Evaluation of UCI multiplexing schemes on PUSCH in case of Su-Mimo", Nokia Siemens Networks, "3GPP TSG RAN WG1 Meeting #61 R1-102962", Montreal, Canada, May 14, 2010.

Huawei, HiSilicon, "Enhancement for transmission of UCI on PUSCH, "R1-112055", 3GPP TSG RAN WGI Meeting #66", Athens, Greece, Aug. 22, 2011.

ZTE, "Support of simultaneous transmission for periodic CSI and HARQ-ACK, "R1-120295", 3GPP TSG RAM WG1 Meeting #68", Dresden, Germany, Feb. 6, 2012.

Texas Instruments, CSI feedback to support downlink CoMP, 3GPP TSG RAN WG1 Meeting #68 R1-120463, Feb. 6-10, 2012, URL: http://www.3gpp.org/ftp/TSG_RAN/WG1_RL1/TSGR1_68/Docs/R1-120463.zip.

3GPP TSG RAN WG1 66, Texas Instruments, Discussion on UCI Transmission Enhancements for Rel.11 Enhanced Uplink, 6.7.2, Athens, Greece, Aug. 22-26, 2011, R1-112159.

3GPP TSG RA WG1 #61bis, LG Electronics, UCI Multiplexing for Multi-layer PUSCH Transmission, 6.4.2, Dresden, Germany, Jun. 28-Jul. 2, 2010, R1-103974.

* cited by examiner

METHOD FOR TRANSMITTING UPLINK CONTROL INFORMATION

BACKGROUND OF THE INVENTION

1. Field of the Invention

The present invention relates to a method for transmitting uplink control information (UCI) in a wireless communication system, and more particularly, to a method for transmission of UCI over a physical uplink shared channel (PUSCH).

2. Description of the Prior Art

Long Term Evolution (LTE)/LTE-Advanced technology is a major research and development project initiated by the 3rd Generation Partnership Project (3GPP) in the recent years. LTE/LTE-Advanced, based on the Orthogonal Frequency Division Multiplexing/Frequency Division Multiple Access (OFDM/FDMA) technology, is dubbed as the "quasi-4G" technology. In LTE/LTE-Advanced, non-periodical UCI is multiplexed on a physical uplink shared channel (PUSCH) individually or together with uplink-shared channel (UL-SCH) data. Even periodical UCI may be transmitted over the PUSCH.

However, with the development of the LTE/LTE-Advanced, Coordinated Multi-Point (CoMP) technique is introduced and thus the contents of UCI involve multiple points instead of a single point. Accordingly, transmission mechanisms such as coding and multiplexing of the UCI on the PUSCH need to be reconsidered.

SUMMARY OF THE INVENTION

The present invention provides a method for transmitting UCI in a CoMP system so as to solve the issue of coding and multiplexing UCI when the CoMP technology is used in single-antenna and multi-antenna systems.

An embodiment of the present invention provides a method for transmitting channel state information (CSI) of multiple coordinated points in a CoMP system. The method includes coding the CSI of the multiple coordinated points, modulating the coded CSI of the multiple coordinated points, and multiplexing the modulated CSI on a PUSCH. The multiplexing of a rank indicator (RI) in the CSI includes multiplexing different RIs for different uplink ranks, and the multiplexing of a channel quality indicator/precoding matrix indicator (CQI/PMI) in the CSI includes multiplexing the CQI/PMI in a code word with the highest modulation and coding order and in other code words.

In an embodiment, the CSI of the multiple coordinated points is coded by one of a joint coding, separate coding and hybrid coding. The hybrid coding includes performing a joint coding for the CSI of the coordinated points in each joint coded group, and the number of the coordinated points in the joint coded group is designated by upper-layer signaling.

In an embodiment, the method further includes defining indexes of the multiple coordinated points so as to differentiate the CSI of different coordinated points.

In another embodiment, the multiplexing of the CSI further includes allocating the same or different resource offset parameters for the CSI after the separate coding or hybrid coding, and the resource offset parameters are configured by the upper-layer signaling.

In yet another embodiment, the method further includes transmitting the CSI after the separate coding or hybrid coding in sub-frames continuously or in sub-frames at a predetermined interval, in which the predetermined interval is set by upper-layer signaling. Moreover, the method may include transmitting the CSI, connected in a predetermined order, in one sub-frame. In that case, the upper-layer signaling is required to indicate the start point of the coded CSI.

In still another embodiment, a beta value of the CSI after the joint coding is adjusted when the CSI is mapped to a resource block, and the beta value is a parameter used for calculating the number of information units.

According to another embodiment of the present invention, the multiplexing of the RI in the CSI further includes repeatedly multiplexing the RI on all the uplink ranks, instead of performing a spatial multiplexing.

An embodiment of the present invention further provides a method for coding CSI of multiple coordinated points in a CoMP system. The method includes determining an information bit number of the CSI of each coordinated point in the multiple coordinated points, arranging the determined information bit number of each coordinated point in a predetermined order to form an information bit sequence, and inputting the information bit sequence into a joint coder for joint coding.

In an embodiment, the information bit number of the CSI of each coordinated point in the multiple coordinated points is determined according to a mode configuration of each coordinated point. In another embodiment, the joint coder includes one of a Reed-Muller coder and a truncated convolutional coder. For the RI, when the bit number of the formed information bit sequence exceeds 11 bits, the joint coder includes multiple connected Reed-Muller coders, and the information bit sequence is segmented and input into the multiple connected Reed-Muller coders. According to an embodiment, the segmentation is implemented based on an equal bit number or a maximum limit of the input bit number of the Reed-Muller coder.

The present invention provides a novel method for coding and multiplexing UCI in the CoMP system, and provides a novel multiplexing mechanism for a multiple input multiple output (MIMO) system. Therefore, the issue in the application of the CoMP technology that one user equipment (UE) transmits UCI of multiple coordinated points is solved, and the application of the CoMP technology is further promoted.

DETAILED DESCRIPTION

To better understand the spirit of the present invention, the present invention is further described below with exemplary embodiments.

In the field of wireless communications, UCI generally includes Hybrid Automatic Repeat Request-Acknowledge (HARQ-ACK), RI, CQI, and PMI, in which the CQI and PMI are usually used together, and the RI, CQI and PMI are also referred to as CSI.

According to the CoMP technology, for the transmission of the HARQ-ACK, each UE is capable of sending two code blocks at most, and each code block has 1 bit. Therefore, even if multiple coordinated points serve for one UE, the UE can still transmit the HARQ-ACK in a conventional single point manner when feeding back the HARQ-ACK. For example, the techniques such as channel coding, modulation and multiplexing used in LTE-Rel.8 are also used in the HARQ-ACK, which is not further discussed.

In a communication system applying the CoMP technology, each coordinated point has its corresponding CSI (including the RI and CQI/PMI), and for each UE, the corresponding multiple coordinated points are not fixed, and the number of the coordinated points is also changeable and unlimited. To transmit the CSI of the multiple coordinated points, a series of problems including coding and multiplexing of the CSI need to be solved, and how to multiplex the CSI to different ranks (or layers) in a MIMO system also needs to be considered.

An embodiment of the present invention provides a method for coding and multiplexing an RI and a CQI/PMI when the RI and CQI/PMI are transmitted on a PUSCH in a CoMP system. For example, joint coding or separate coding is performed on CSI of multiple coordinated points and the coded CSI is multiplexed on a single antenna.

Another embodiment of the present invention provides a method for coding and multiplexing an RI and a CQI/PMI when the RI and CQI/PMI are transmitted on a PUSCH in a MIMO system using the CoMP technology. For example, in a novel spatial multiplexing method for an RI, the RI is applied in multiple protocol layers, while the CQI/PMI may be multiplexed in code words other than the one with the highest quality, for example, the highest modulation and coding order. In that case, for instance, the CQI/PMI is multiplexed in a code word with the lowest quality.

Figure 1:
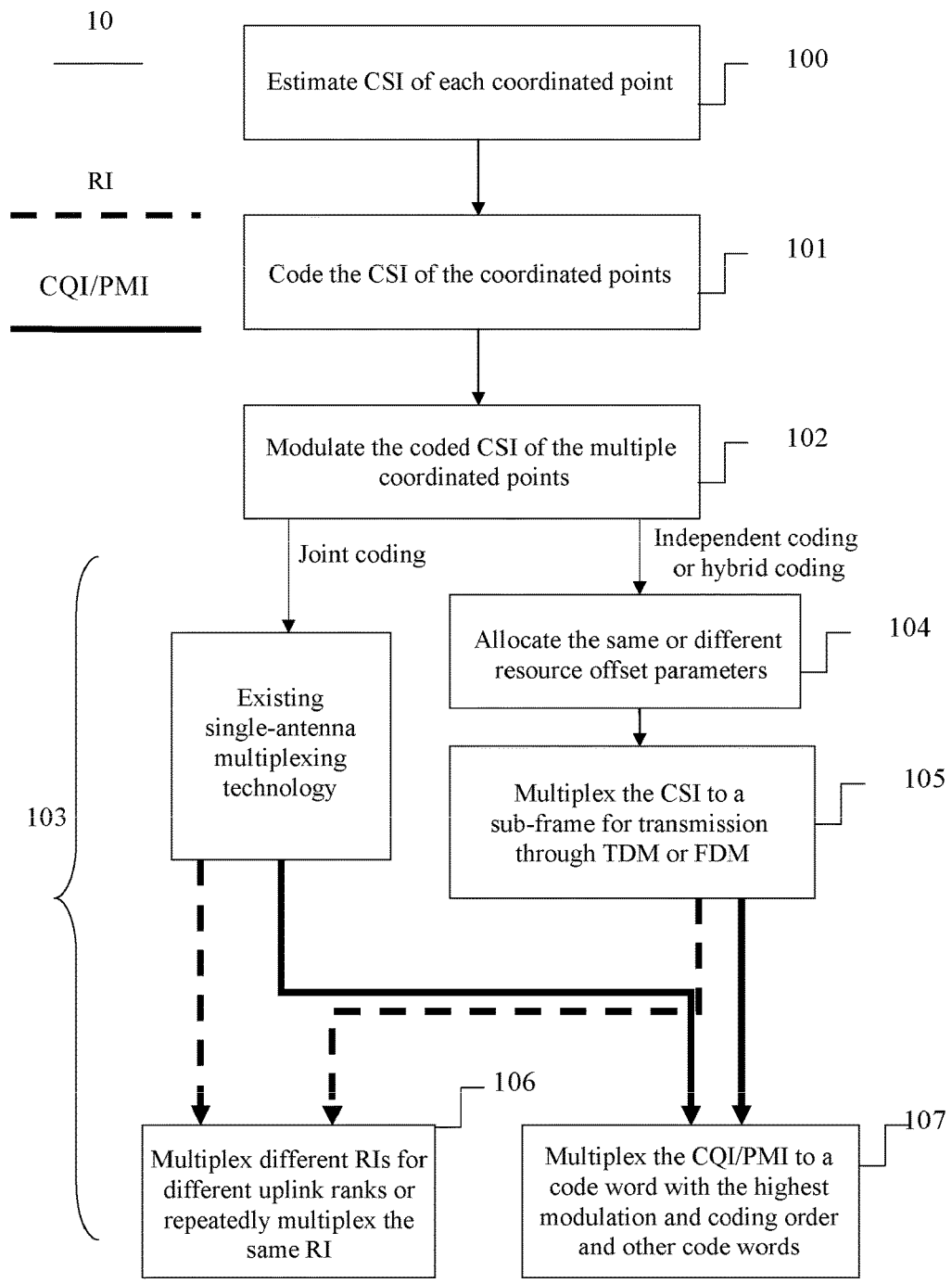
FIG. 1 is a flow chart of a method for transmitting CSI of multiple coordinated points in a CoMP system according to an embodiment of the present invention.

FIG. 1 is a flow chart of a method 10 for transmitting CSI of multiple coordinated points in a CoMP system on a PUSCH according to an embodiment of the present invention in a MIMO system. It should be noted that this flow chart is provided for illustrating the method of the present invention, and the sequence and relationship of the steps in the method are determined by those in the field according to actual applications, so this flow chart shall not be considered as a limitation to the present invention.

In Step 100, a UE receives reference signals from multiple coordinated points, and estimates CSI of each coordinated point based on the reference signals, the CSI including an RI and a CQI/PMI.

In Step 101, the CSI of the coordinated points is coded. The coding may include performing a joint coding for the CSI of the multiple coordinated points, performing a separate coding for the CSI of each coordinated point in the multiple coordinated points, or performing a hybrid coding. For example, the hybrid coding may include first grouping the coordinated points for a joint coding by, for example, grouping two coordinated points in the multiple coordinated points as one joint coded group. The number of the coordinated points in the joint coded group may be designated by upper-layer signaling and thus is changeable. The joint coding is performed for the CSI of the coordinated points in each joint coded group. During the coding, an index of each coordinated point needs to be defined, so as to differentiate the CSI of different coordinated points. These coding modes have different advantages. Taking the separate coding for example, when the CSI resources, for example, RI resources of the multiple coordinated points in one sub-frame are insufficient, the coded RI block can be easily mapped to a subsequent sub-frame. In the separate coding, distributed processing may be adopted, and each coordinated point may detect its own CSI.

In Step 102, the coded CSI of the multiple coordinated points is modulated.

In Step 103, the modulated CSI is multiplexed on the PUSCH.

When the joint coding is adopted, for a single antenna, operations such as modulation and multiplexing of the CSI may be performed by using existing technologies, which will not be further described. When the separate coding or hybrid coding is adopted, the CSI may also be modulated by using the existing technology. However, for the multiplexing and transmission of the CSI, the present invention further provides new mechanisms.

According to an embodiment of the present invention, in Step 104, for each antenna, when the CSI, for example, RI is multiplexed on the PUSCH, the method further includes allocating the same or different resource offset parameters for the RI after the separate coding or hybrid coding, and the resource offset parameter indicates an offset of the UCI relative to data of a Modulation and Coding Scheme (MCS). The resource offset parameter needs to be configured by upper-layer signaling.

In Step 105, the CSI, for example, RI is multiplexed in a sub-frame for transmission through Time Division Multiplexing (TDM) or Frequency Division Multiplexing (FDM). According to an embodiment of the present invention, the TDM includes multiplexing one piece of coded CSI, for example, RI in one sub-frame for transmission, multiplexing another piece of coded CSI, for example, RI in another sub-frame connected to the foregoing sub-frame for transmission, and so forth. That is, the coded CSI is transmitted in sub-frames continuously. In another embodiment, the coded CSI may also be transmitted in sub-frames at a predetermined interval, and the predetermined interval may be set by the upper-layer signaling that configures the resource offset parameter. According to an embodiment of the present invention, the FDM includes connecting the coded CSI, for example, CQI/PMI in a predetermined order and multiplexing the CSI in one sub-frame for transmission. For instance, the CSI is arranged in an ascending order based on the indexes of the coordinated points. It should be noted that, when the FDM is applied on the CQI/PMI after the separate coding, if a centralized processing manner is adopted, upper-layer signaling (which may also be the upper-layer signaling that configures the resource offset parameter) is required to indicate the start point of the CQI/PMI after the separate coding to, for example, notify the end point or length of the previous CQI/PMI. The RI may have the similar condition. For the distributed processing, each coordinated point receives its own CQI/PMI and has a separate start point, so the notification through signaling is not needed. In the MIMO system, multiple antennas exist, and on the basis of the foregoing single-antenna multiplexing, the multiplexing between multiple antennas also needs to be considered. According to an embodiment of the present invention, in multi-antenna multiplexing, the RI and the CQI/PMI are multiplexed in different manners.

For the RI in the CSI, according to an embodiment of the present invention, in Step 106, spatial multiplexing may be performed in the case of multiple antennas. That is, different RIs are multiplexed for all the uplink ranks so as to improve the transmission efficiency, or different RIs are multiplexed for all the uplink ranks so as to obtain a linear signal-to-noise ratio (SNR) combining gain. This multi-antenna multiplexing is definitely applicable to the foregoing coding modes.

For the CQI/PMI in the CSI, according to an embodiment of the present invention, in Step 107, the CQI/PMI may be multiplexed in a code word with the highest modulation and coding order and in other code words in the case of multiple antennas, so as to reduce high overhead when the CoMP technology is applied. This multi-antenna multiplexing is definitely applicable to the foregoing coding modes.

According to an embodiment of the present invention, a beta value of the modulated CSI needs to be adjusted when the CSI is mapped to a resource block, and the beta value is a parameter used for calculating the number of information units.

Figure 2:
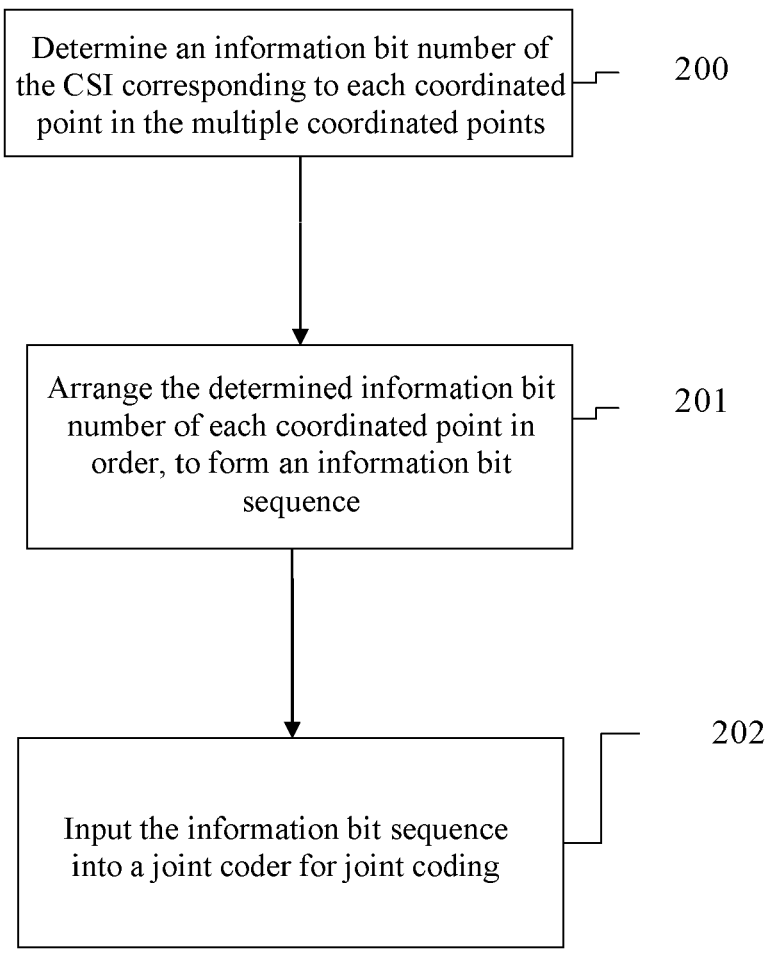
FIG. 2 is a flow chart of a method for performing a joint coding for multiple pieces of CSI according to an embodiment of the present invention.

The present invention further provides a method for performing a joint coding for multiple pieces of CSI in the application of the CoMP technology. FIG. 2 is a flow chart of a method 20 for performing a joint coding for multiple pieces of CSI according to an embodiment of the present invention. In Step 200, an information bit number of the CSI of each coordinated point in the multiple coordinated points is determined according to, for example, the mode configuration of each coordinated point.

In Step 201, the determined information bit number of each coordinated point is arranged in a predetermined order according to, for example, a fixed order of the indexes of the coordinated points, so as to form an information bit sequence.

In Step 202, the information bit sequence is input into a joint coder for joint coding. The joint coder may include one coder or multiple connected coders, and the number of the coders depends on the required bit number. Taking an existing (32, O) Reed-Muller coder as an example, if "O" is 11, when the bit number of the information bit sequence is 20, two connected Reed-Muller coders are needed. The information bit sequence, for example, the RI needs to be segmented and input into the multiple connected Reed-Muller coders. The segmentation may be implemented based on an equal bit number or a maximum limit of the input bit number of the Reed-Muller coder, for example, 11. According to an embodiment of the present invention, for the CQI/PMI, when the bit number of the formed information bit sequence exceeds 11 bits, a truncated convolutional coder may be selected to perform a convolutional coding, and the Reed-Muller coder is not used. Subsequent processing such as modulation and multiplexing can be performed for the CSI after the joint coding. When the joint coding is adopted in the hybrid coding, the multiple coordinated points in the joint coding belong to the same joint coded group.

Although the technical contents and features of the present invention are described above, various replacements and modifications can be made by persons skilled in the art based on the teachings and disclosure of the present invention without departing from the spirit thereof. Therefore, the scope of the present invention is not limited to the described embodiments, but covers various replacements and modifications that do not depart from the present invention as defined by the appended claims.

We claim:

1. A method for transmitting channel state information (CSI) of multiple coordinated points in a coordinated multi-Point (CoMP) system, the method comprising:
    coding the CSI of the multiple coordinated points;
    modulating the coded CSI of the multiple coordinated points;
    multiplexing the modulated CSI on a physical uplink shared channel (PUSCH);
    one of:
        repeatedly multiplexing a same rank indicator (RI) on all uplink ranks; and
        multiplexing different RIs for different uplink ranks; and
    multiplexing a channel quality indicator/precoding matrix indicator (CQI/PMI) in the CSI comprising multiplexing the CQI/PMI in a code word with the highest modulation and coding order and in other code words;
    wherein the CSI of the multiple coordinated points is coded by one of a separate coding and hybrid coding; and
    wherein the method further comprises:
    when the CSI is multiplexed on the PUSCH, allocating the same or different resource offset parameters for the CSI after the separate coding or hybrid coding, the resource offset parameters being configured by upper-layer signaling;
    indicating by the upper-layer signaling a start point of the coded CSI when using separate coding and not indicating a start point when using distributed processing; and
    transmitting the CSI after the separate coding or hybrid coding, wherein the CSI is transmitted connected in a predetermined order, and in one sub-frame.

2. The method according to claim 1, wherein the CSI is transmitted in sub-frames continuously or in sub-frames at a predetermined interval, and wherein the predetermined interval is set by the upper-layer signaling.

3. The method according to claim 1, wherein a beta value of the modulated CSI is adjusted when the CSI is mapped to a resource block, and the beta value is a parameter used for calculating the number of information units.

4. The method according to claim 1 further comprising defining indexes of the multiple coordinated points so as to differentiate the CSI of different coordinated points.

5. A method for transmitting channel state information (CSI) of multiple coordinated points in a coordinated multi-point (CoMP) system, the method comprising:
    coding the CSI of the multiple coordinated points;
    modulating the coded CSI of the multiple coordinated points;
    multiplexing the modulated CSI on a Physical Uplink Shared Channel (PUSCH); and
    one of:
        repeatedly multiplexing a same rank indicator (RI) on all uplink ranks; and
        multiplexing different RIs for different uplink ranks; and
    wherein the CSI of the multiple coordinated points is coded by one of a separate coding and hybrid coding; and
    wherein the method further comprises:
    when the CSI is multiplexed on the PUSCH, allocating the same or different resource offset parameters for the CSI after the separate coding or hybrid coding, the resource offset parameters being configured by upper-layer signaling;
    indicating by the upper-layer signaling a start point of coded CQI/PMI when using separate coding and not indicating a start point when using distributed processing; and
    transmitting the CSI after the separate coding or hybrid coding, wherein the CSI is transmitted connected in a predetermined order, and in one sub-frame.

6. The method according to claim 5, further comprising multiplexing a channel quality indicator/precoding matrix indicator (CQI/PMI) in the CSI comprising multiplexing the CQI/PMI in a code word with the highest modulation and coding order and in other code words.

7. The method according to claim 5 wherein the CSI is transmitted in sub-frames continuously or in sub-frames at a predetermined interval, and wherein the predetermined interval is set by the upper-layer signaling.

8. The method according to claim 5, wherein a beta value of the modulated CSI is adjusted when the CSI is mapped to a resource block, and the beta value is a parameter used for calculating the number of information units.

9. The method according to claim 5 further comprising defining indexes of the multiple coordinated points so as to differentiate the CSI of different coordinated points.

10. A method for transmitting channel state information (CSI) of multiple coordinated points in a coordinated multi-point (CoMP) system, the method comprising:
coding the CSI of the multiple coordinated points;
modulating the coded CSI of the multiple coordinated points;
multiplexing the modulated CSI on a physical uplink shared channel (PUSCH); and
multiplexing a channel quality indicator/precoding matrix indicator (CQI/PMI) in the CSI comprising multiplexing the CQI/PMI in a code word with the highest modulation and coding order and in other code words;
wherein the CSI of the multiple coordinated points is coded by one of a separate coding and hybrid coding; and
wherein the method further comprises:
when the CSI is multiplexed on the PUSCH, allocating the same or different resource offset para meters for the CSI after the separate coding or hybrid coding, the resource offset parameters being configured by upper signaling;
indicating by the upper-layer signaling a start point of the coded CQI/PMI when using separate coding and not indicating a start point when using distributed processing; and
transmitting the CSI after the separate coding or hybrid coding, wherein the CSI is transmitted connected in a predetermined order, and in one sub-frame.

11. The method according to claim 10, further comprising one of multiplexing different rank indicators (RIs) for different uplink ranks, and repeatedly multiplexing a same RI on all the uplink ranks.

12. The method according to claim 10 wherein the CSI is transmitted in sub-frames continuously or in sub-frames at a predetermined interval, and wherein the predetermined interval is set by the upper-layer signaling.

13. The method according to claim 10, wherein a beta value of the modulated CSI is adjusted when the CSI is mapped to a resource block, and the beta value is a parameter used for calculating the number of information units.

14. The method according to claim 10 further comprising defining indexes of the multiple coordinated points so as to differentiate the CSI of different coordinated points.

15. A method for transmitting channel state information (CSI) of multiple coordinated points in a coordinated multi-Point (CoMP) system, the method comprising:
performing a separate coding for the CSI of each coordinated point in the multiple coordinated points or in each joint coded group;
modulating the coded CSI of the multiple coordinated points;
multiplexing the modulated CSI on a physical uplink shared channel (PUSCH);
allocating the same resource offset parameters for the coded CSI, the resource offset parameters being configured by upper-layer signaling;
indicating by the upper-layer signaling a start point of coded CQI/PMI when using separate coding and not indicating a start point when using distributed processing; and
transmitting the coded CSI, wherein the coded CSI is transmitted connected in a predetermined order, and in one sub-frame;
wherein the number of the coordinated points in the joint coded group is designated by the upper-layer signaling.

16. The method according to claim 15, wherein the coded CSI is transmitted in sub-frames continuously or in sub-frames at a predetermined interval, and wherein the predetermined interval is set by the upper-layer signaling.

17. The method according to claim 15 further comprising defining indexes of the multiple coordinated points so as to differentiate the CSI of different coordinated points.

18. The method according to claim 15, wherein a beta value of the modulated CSI needs to be adjusted when the CSI is mapped to a resource block, and the beta value is a parameter used for calculating the number of information units.

19. The method according to claim 1, comprising multiplexing the different RIs for different uplink ranks without repeatedly multiplexing the same RI on all the uplink ranks.

20. The method according to claim 1, comprising repeatedly multiplexing the same RI on all the uplink ranks without multiplexing the different RIs for different uplink ranks.

21. The method according to claim 1, wherein the allocating comprises allocating the same resource offset parameters for the CSI after the separate coding or the hybrid coding.

22. The method according to claim 1, wherein the allocating comprises allocating different resource offset parameters for the CSI after the separate coding or the hybrid coding.

23. The method of claim 4 further comprising arranging the CSI in ascending order based on the indexes of the multiple coordinated points.

* * * * *